(12) United States Patent
Kim et al.

(10) Patent No.: US 8,737,946 B2
(45) Date of Patent: May 27, 2014

(54) DOWN-CONVERTER, UP-CONVERTER, RECEIVER AND TRANSMITTER APPLYING THE SAME

(71) Applicant: Korea Electronics Technology Institute, Seongnam-si (KR)

(72) Inventors: Ki Jin Kim, Gwangju-si (KR); Kwang Ho Ahn, Yongin-si (KR); Sang Hoon Park, Seoul (KR); Young Jin Kim, Goyang-si (KR); Eun Su Kim, Gwangmyeong-si (KR); Dong Hyun Baek, Seoul (KR); Seoung Yeoung Son, Goyang-si (KR); Jin Young Lee, Goyang-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 13/692,398

(22) Filed: Dec. 3, 2012

(65) Prior Publication Data

US 2013/0147539 A1   Jun. 13, 2013

(30) Foreign Application Priority Data

Dec. 8, 2011   (KR) .................. 10-2011-0131345

(51) Int. Cl.
*H04B 1/26* (2006.01)
*H04B 15/00* (2006.01)

(52) U.S. Cl.
USPC .......................................... 455/313; 455/334

(58) Field of Classification Search
CPC ....... H04B 1/30; H03D 7/165; H03D 7/1466; H03D 3/009
USPC .................. 455/313–318, 323, 334
See application file for complete search history.

(56) References Cited

U.S. PATENT DOCUMENTS

| | | | |
|---|---|---|---|
| 7,167,686 B2 * | 1/2007 | See et al. | 455/77 |
| 7,483,687 B2 * | 1/2009 | Carrez | 455/318 |
| 7,680,211 B1 * | 3/2010 | von der Embse | 375/299 |

* cited by examiner

*Primary Examiner* — Nhan Le
(74) *Attorney, Agent, or Firm* — Lowe Hauptman & Ham, LLP

(57) ABSTRACT

A down-frequency conversion circuit and up-frequency conversion circuit, and a receiver and transmitter applying the same are provided. The down-frequency conversion circuit includes a harmonic mixer and general mixer, and thus becomes able to convert frequency using one LO (Local Oscillator) frequency, thereby reducing burden on generating LO frequency.

7 Claims, 5 Drawing Sheets

DOWN-CONVERTER, UP-CONVERTER, RECEIVER AND TRANSMITTER APPLYING THE SAME

CROSS REFERENCE TO RELATED APPLICATION

This application claims the priority of Korean Patent Application No. 10-2011-0131345, filed on Dec. 8, 2011 in the KIPO (Korean Intellectual Property Office), which is incorporated herein by reference in its entirety.

BACKGROUND OF THE INVENTION

1. Field of the Invention

Methods and apparatuses consistent with the exemplary embodiments relate to a down-converter, up-converter, receiver and transmitter applying the same, and more particularly, to a down-converter and up-converter using a plurality of mixers, and a receiver and transmitter applying the same.

2. Background Art

In a 60 GHz RF (Radio Frequency) system for high speed data transmission, the method of generating LO (Local Oscillator) signals for frequency conversion is very difficult.

Especially, it is necessary to generate a swing full enough to switch a mixer, and to generate a high frequency of 60 GHz. In a case of making a transceiver with a direct conversion type frequency conversion circuit, generating signals of 60 GHz consumes a lot of power and is highly sensitivity to parasitic, making it difficult to adjust the LC resonance. Furthermore, using a double conversion type frequency conversion circuit requires various LOs, and thus it becomes necessary to generate a VCO (Voltage Controlled Oscillator) frequency of a common high frequency, or make various VCOs.

As such, each of the two types of conventional frequency converters has its advantages, but they also have disadvantages. Thus, there is a need to seek a method for providing a frequency converter which overcomes the above disadvantages of those two types of conventional frequency converters.

SUMMARY OF THE INVENTION

1. Technical Problem

The present disclosure has been presented to resolve the aforementioned problems, and the purpose of the present disclosure is to provide a down-converter and up-converter which include a harmonic mixer and general mixer, and to provide a receiver and transmitter applying the same.

2. Means for Solving the Technical Problem

According to an exemplary embodiment of the present invention, a down-converter may include a harmonic mixer where a signal of a first frequency, an In-phase signal of a second frequency, and a quadrature phase signal of the second frequency are input, and which outputs a signal of a third frequency generated by subtracting a twice value of the second frequency from the first frequency; a first mixer where a signal of the third frequency and an In-phase signal of the second frequency are input, and which outputs an In-phase signal of a fourth frequency generated by subtracting the second frequency from the third frequency; and a second mixer where a signal of the third frequency and a quadrature phase signal of the second frequency are input, and which outputs a quadrature phase signal of a fourth frequency generated by subtracting the second frequency from the third frequency.

In addition, the first frequency may be carrier frequency, the second frequency may be LO (Local Oscillator) frequency, the third frequency may be intermediate frequency, and the fourth frequency may be baseband frequency.

Furthermore, the first frequency may be 60 GHz, and the second frequency may be 20 GHz.

In addition, the aforementioned down-frequency conversion circuit may be applied to a receiver.

Meanwhile, according to an exemplary embodiment of the present disclosure, an up-converter may include a third mixer where an In-phase signal of a fifth frequency and an In-phase signal of a sixth frequency are input, and which outputs a signal of a seventh signal generated by adding the sixth frequency to the fifth frequency; a fourth mixer where a quadrature phase signal of the fifth frequency and a quadrature phase of the sixth frequency are input, and which outputs a signal of a seventh frequency generated by adding the fifth frequency to the sixth frequency; and a harmonic mixer where a signal of the seventh frequency, an In-phase signal of the sixth frequency, and a quadrature signal of the sixth frequency are input, and which outputs a signal of an eighth frequency generated by adding a twice value of the sixth frequency to the seventh frequency.

In addition, the fifth frequency may be baseband frequency, the sixth frequency may be LO (Local Oscillator) frequency, the seventh frequency may be intermediate frequency, and the eighth frequency may be carrier frequency.

Furthermore, the sixth frequency may be 20 GHz, and the eighth frequency may be 60 GHz.

In addition, the aforementioned up-frequency conversion circuit may be applied to a transmitter.

3. Advantageous Effects of Invention

According to various exemplary embodiments of the present disclosure, it becomes able to provide a down-converter and up-converter which include a harmonic mixer and general mixer, and a receiver and transmitter applying the same, thereby enabling frequency conversion using one Local Oscillator (LO) frequency and reducing burden on generating LO frequency.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
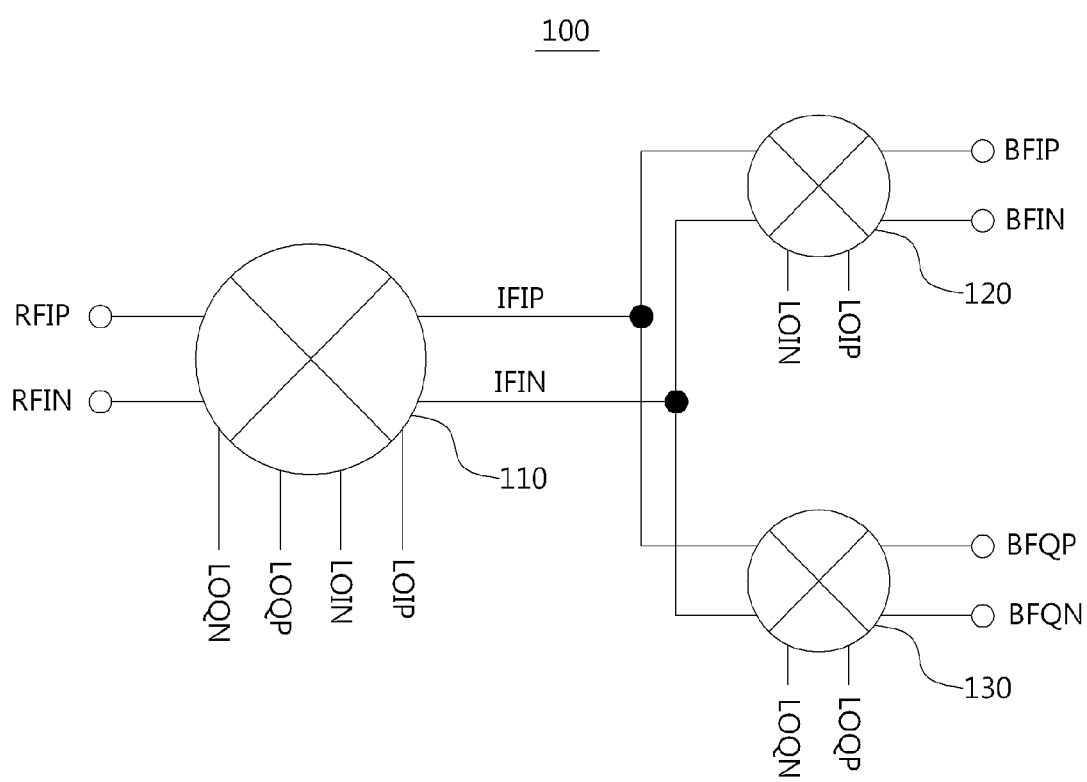
FIG. 1 illustrates a structure of a down-frequency conversion circuit, according to an exemplary embodiment of the present disclosure.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a diagram illustrating a structure of a down-frequency conversion circuit 100, according to an exemplary embodiment of the present disclosure. As illustrated in FIG. 1, the down-frequency conversion circuit 100 includes a harmonic mixer 110, first mixer 120, and second mixer 130.

Herein, the first mixer 120 and second mixer 130 are general mixers. A general mixer outputs a signal of a frequency generated by adding or subtracting an LO (Local Oscillator) frequency to/from an input signal frequency. Meanwhile, in the harmonic mixer, an input signal, and two LO frequency signals having reverse phases in a same frequency are input, and the harmonic mixer outputs a signal of a frequency generated by adding or subtracting a twice value of frequency of the LO frequency to/from the input signal frequency.

In the harmonic mixer 110, signals (RFIP, RFIN) of a first frequency, In-phase signals (LOIP, LOIN) of a second frequency, and quadrature phase signals (LOQP, LOQN) of the second frequency are input. Herein, the first frequency represents carrier frequency, and the second frequency represents LO (Local Oscillator) frequency. Therefore, the signal of the first frequency is the input signal received, and the signal of the second frequency is the LO signal.

In addition, the harmonic mixer 110 outputs signals (IFIP, IFIN) of a third frequency generated by subtracting a twice value of the second frequency from the first frequency of the input signal. That is, "third frequency=first frequency−(2× second frequency)". Herein the third frequency is intermediate frequency.

In the first mixer 120, signals (IFIP, IFIN) of the third frequency and In-phase signals (LOIP, LOIN) of the second frequency are input. In addition, the first mixer 120 outputs In-phase signals (BFIP, BFIN) of the fourth frequency generated by subtracting the second frequency from the third frequency.

In the second mixer 130, signals (IFIP, IFIN) of the third signal and In-phase signals (LOQP, LOQN) of the second frequency are input. In addition, the second mixer 130 outputs In-phase signals (BFQP, BFQN) of the fourth frequency generated by subtracting the second frequency from the third frequency.

Herein, "fourth frequency=third frequency−second frequency". In addition, the fourth frequency is baseband frequency, and the signals of the fourth frequency are baseband signals.

For example, in a case where the first frequency (carrier frequency) is 60 GHz and the second frequency (LO frequency) is 20 GHz, the frequency of the signals output from the harmonic mixer 110 is 20 GHz, and the frequency of the signals output from the first mixer 120 and second mixer 130 is baseband frequency.

Figure 2:
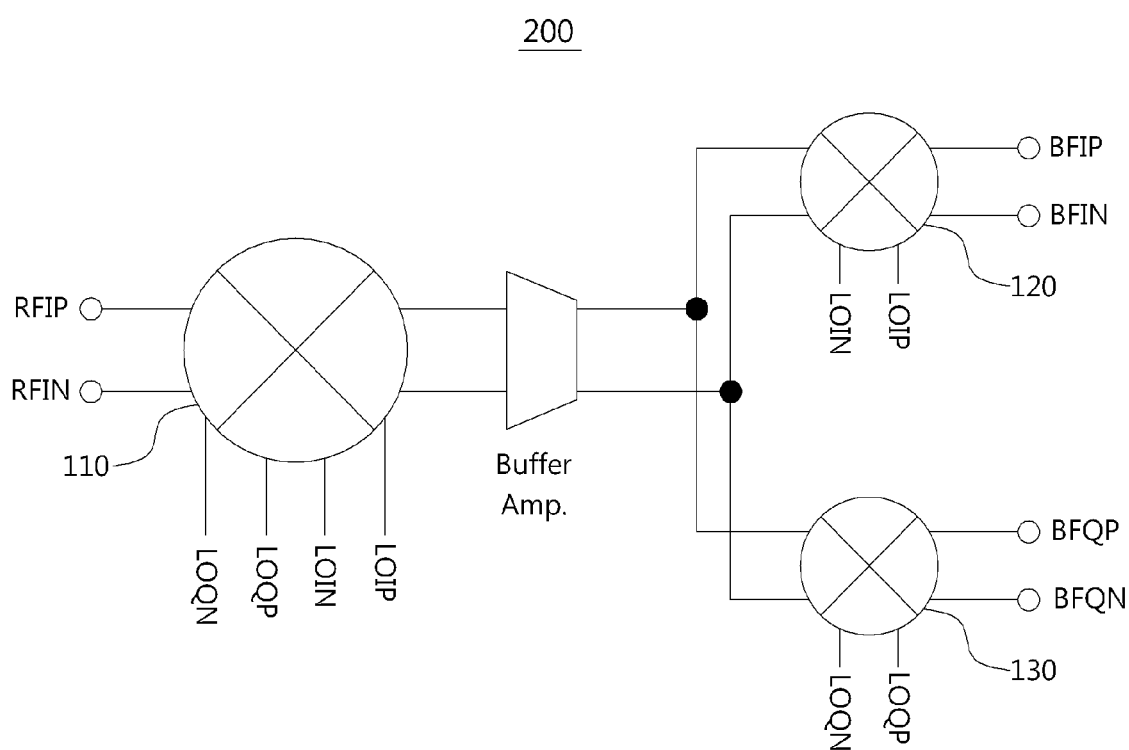
FIG. 2 is a down-frequency conversion circuit which includes a buffer amplifier, according to an exemplary embodiment of the present disclosure.

FIG. 2 is a diagram illustrating a down-frequency conversion circuit 200, according to an exemplary embodiment of the present disclosure. The down-frequency conversion circuit 200 of FIG. 2 is a structure where a buffer amplifier 210 has been added to the down-frequency conversion circuit 100 of FIG. 1.

The buffer amplifier 210 amplifiers signals output from the harmonic mixer 110. Therefore, the down-frequency conversion circuit 200 becomes able to amplify an intensity of a conversion signal through the buffer amplifier 210.

Figure 3:
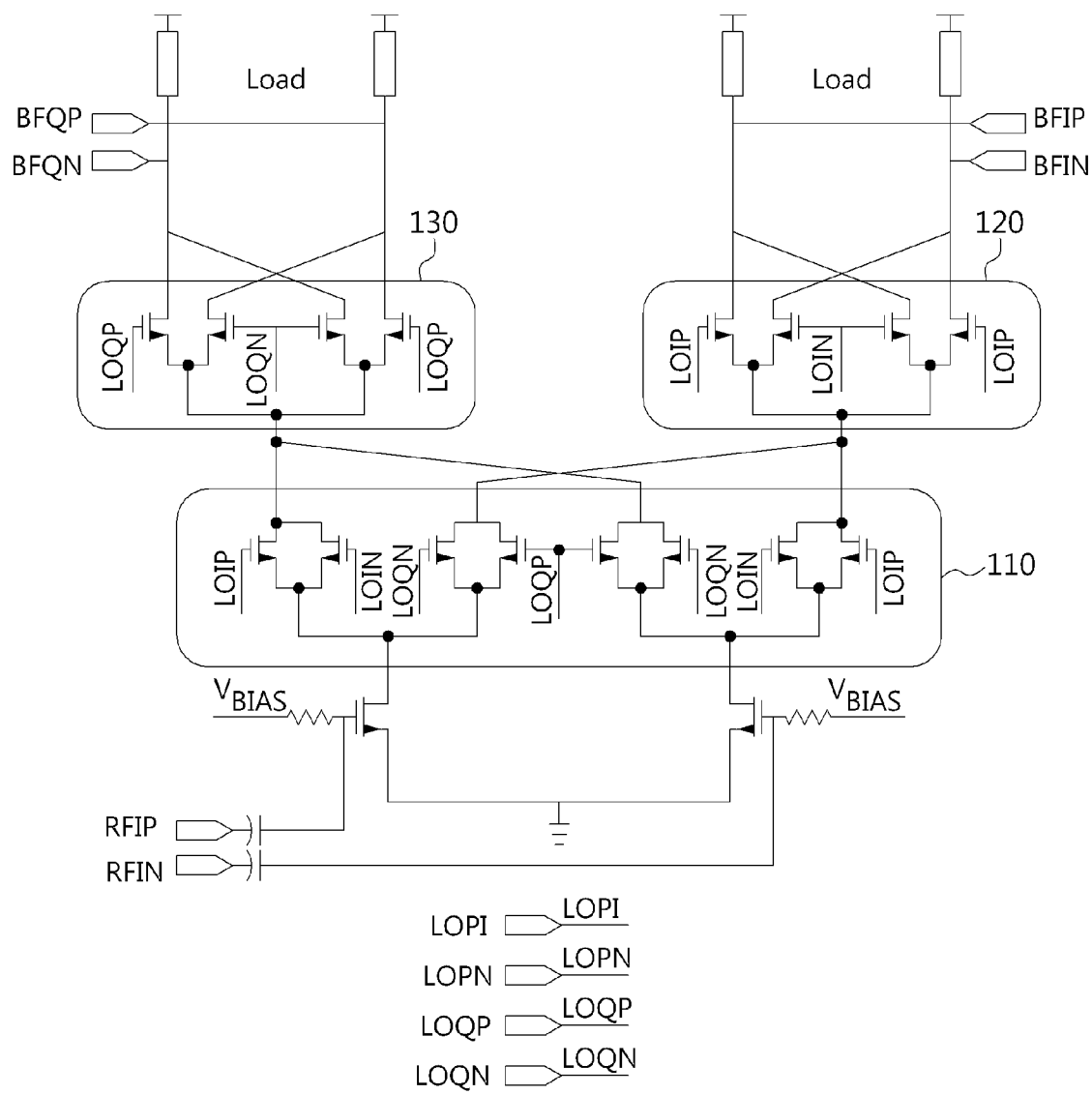
FIG. 3 is a circuit diagram illustrating the down-frequency conversion circuit of FIG. 1 in more detail, according to an exemplary embodiment of the present disclosure.

FIG. 3 is a detailed circuit diagram of the down-converter 100 of FIG. 1, according to an exemplary embodiment of the present disclosure. As illustrated in FIG. 3, the harmonic mixer 110 is embodied to include a total of 8 transistors, and the first mixer 120 and third mixer 130 are embodied to include 4 transistors each.

A down-converter of such a structure becomes able to convert the frequency of RF signals input into baseband frequency using only one LO frequency. Therefore, it becomes possible to have only one LO and VCO (Voltage Controlled Oscillator) for generating frequency.

Furthermore, the down-frequency conversion circuit illustrated in FIGS. 1 to 3 may be applied to a receiver to convert a received signal into a baseband signal. Then, since there is one LO, VCO included in the down-frequency converter, it becomes possible to form a receiver at a lower cost.

Figure 4:
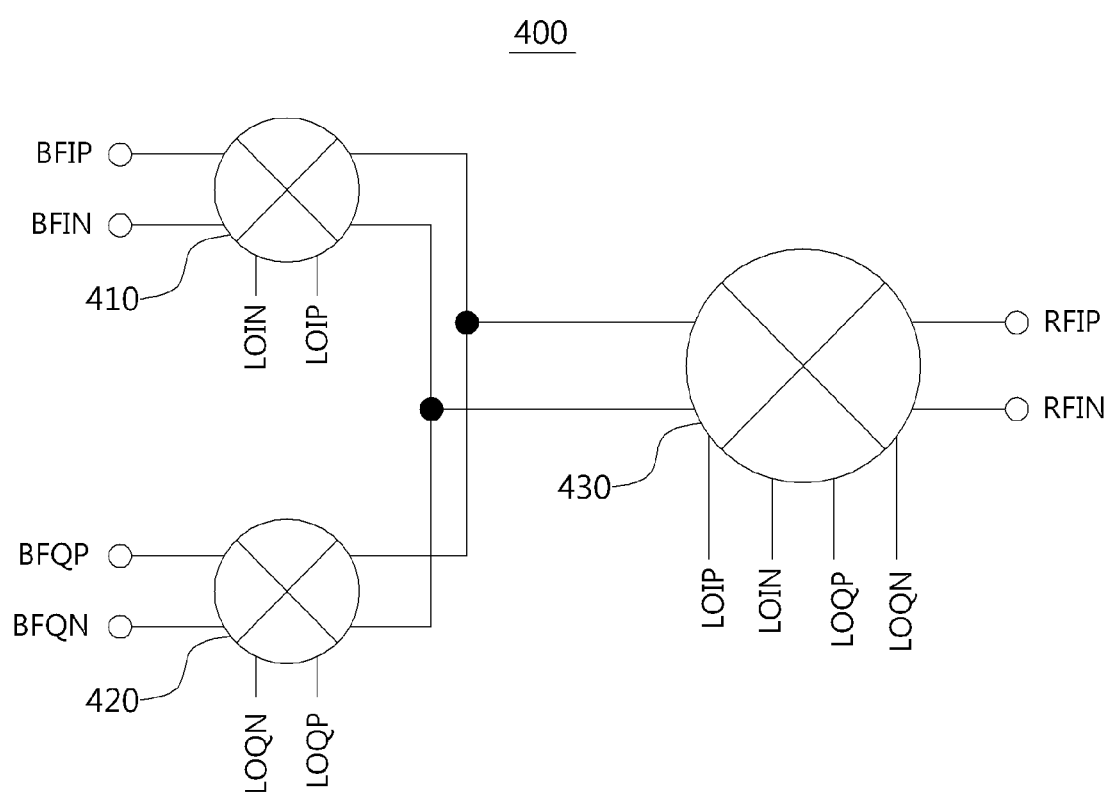
FIG. 4 illustrates a structure of an up-frequency conversion circuit, according to an exemplary embodiment of the present disclosure.

Hereinbelow is explanation on the up-frequency conversion circuit, with reference to FIGS. 4 and 5. FIG. 4 illustrates a structure of a up-frequency conversion circuit 400 according to an exemplary embodiment of the present disclosure. As illustrated in FIG. 4, the up-frequency conversion circuit 400 includes a third mixer 410, fourth mixer 420, and harmonic mixer 430.

Herein, the third mixer 410 and fourth mixer 420 are general mixers. A general mixer outputs a signal of a frequency generated by adding or subtracting one LO (Local Oscillator) frequency to/from one input signal frequency. On the other hand, in the harmonic mixer, an input signal and two LO frequency signals having reverse phases in a same frequency are input, and the harmonic mixer outputs a signal of a frequency by adding or subtracting a twice value of the LO frequency to/from the input signal frequency.

In the third mixer 410, In-phase signals (BFIP, BFIN) of the fifth frequency and In-phase signals (LOIP, LOIN) of the sixth frequency are input. In addition, the third mixer 410 outputs signals (IFIP, IFIN) of a seventh frequency generated by adding the sixth frequency to the fifth frequency.

In the fourth mixer 420, quadrature signals (BFQP. BFQN) of the fifth frequency and In-phase signals (LOQP, LOQN) of the sixth frequency are input. In addition, The fourth mixer 420 outputs signals (IFIP, IFIN) of a seventh frequency generated by adding the sixth frequency to the fifth frequency.

Herein, "seventh frequency=fifth frequency+sixth frequency". In addition, the fifth frequency is baseband frequency, and signals of the fifth frequency are baseband signals. Furthermore, the sixth frequency represents frequency of LO (Local Oscillator), and signals of the sixth frequency become LO signals. In addition, the seventh frequency is intermediate frequency.

In the harmonic mixer 430, signals (IFIP, IFIN) of the seventh frequency, In-phase signals (LOIP, LOIN) of the sixth frequency, and quadrature phase signals (LOQP, LOQN) of the sixth frequency are input. In addition, the harmonic mixer 430 outputs signals (RFIP, RFIN) of the eighth frequency generated by adding a twice value of the sixth frequency to the seventh frequency. That is, "eighth frequency=seventh frequency=(2×sixth frequency)". Herein, the eighth frequency is carrier frequency.

For example, in a case where the sixth frequency (LO frequency) is 20 GHz, a frequency of the signals output from the third mixer 410 and fourth mixer 420 is intermediate frequency, 20 GHz, and a frequency of the signals output from the harmonic mixer 430 is carrier frequency, 60 GHz.

Figure 5:
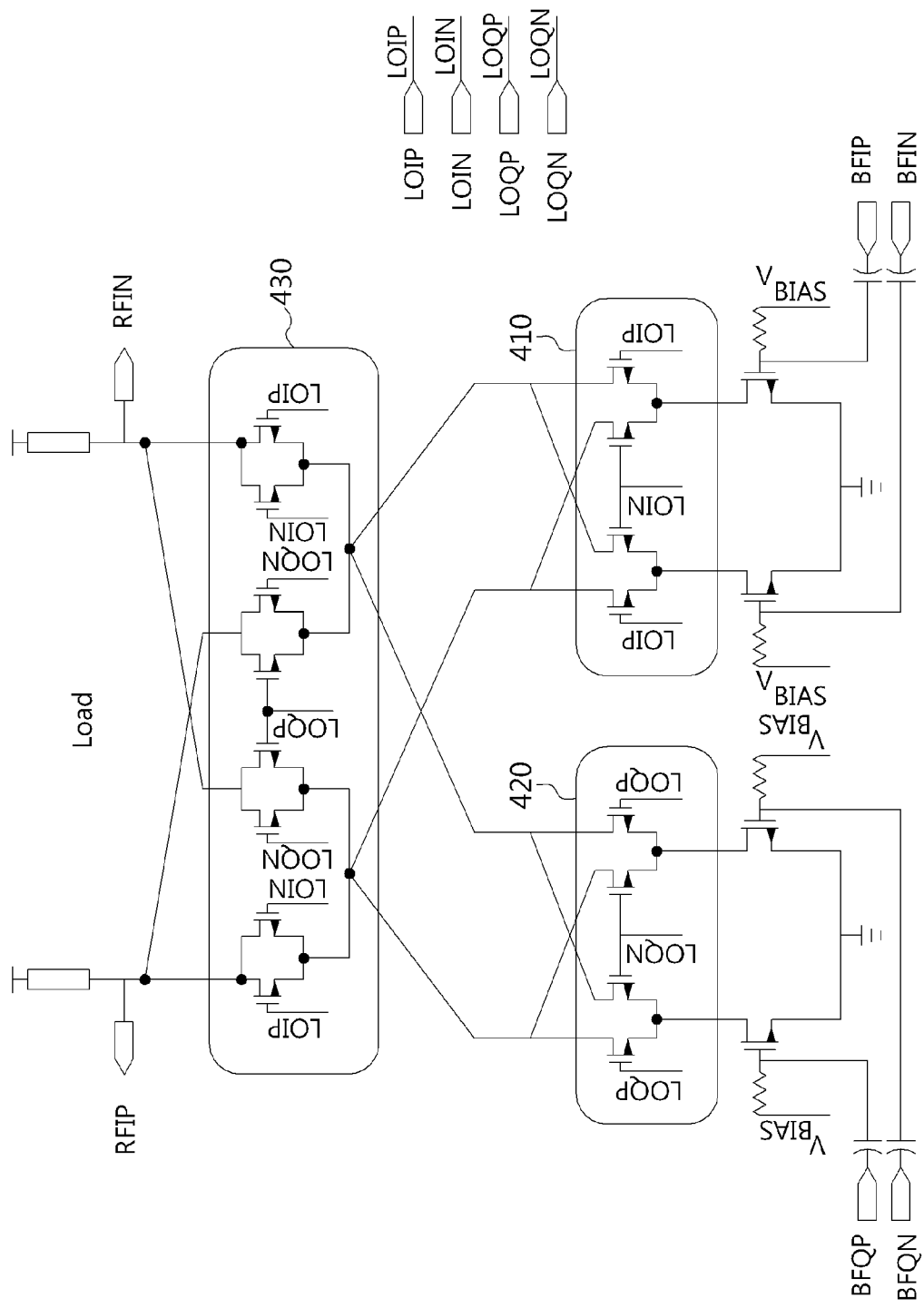
FIG. 5 is a circuit diagram illustrating the up-converter of FIG. 4 in more detail, according to an exemplary embodiment of the present disclosure.

FIG. 5 is a detailed circuit diagram of the up-converter 400 of FIG. 4. As illustrated in FIG. 5, the harmonic mixer 430 is embodied to include a total of 8 transistors, and the third mixer 410 and fourth mixer 420 are embodied to include 4 transistors each.

The up-converter of such a structure becomes able to convert input signals of baseband frequency into RF signals of carrier frequency using only one LO frequency. Therefore, it becomes possible to have only one LO and VCO (Voltage Controlled Oscillator) for frequency generation.

Furthermore, the up-frequency conversion circuit illustrated in FIGS. 4 and 5 may be applied to a transceiver to convert signals to be transmitted from baseband into signals of carrier frequency. Then, since there is one LO, VCO included in the up-converter, it becomes possible to form the transceiver at a lower cost.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A down-converter, comprising:
    a harmonic mixer configured to
        receive a signal of a first frequency, an In-phase signal of a second frequency, and a quadrature phase signal of the second frequency, and
        output a signal of a third frequency generated by using the first frequency and the second frequency;
    a first mixer configured to
        receive the signal of the third frequency and the In-phase signal of the second frequency, and
        output an In-phase signal of a fourth frequency generated by using the third frequency and the second frequency; and
    a second mixer configured to
        receive the signal of the third frequency and the quadrature phase signal of the second frequency, and
        output a quadrature phase signal of the fourth frequency generated by using the third frequency and the second frequency,
    wherein the harmonic mixer is configured to output the signal of the third frequency by subtracting a twice value of the second frequency from the first frequency.

2. The down-converter according to claim 1, wherein the first frequency is a carrier frequency, the second frequency is an LO (Local Oscillator) frequency, the third frequency is an intermediate frequency, and the fourth frequency is a baseband frequency.

3. The down-converter according to claim 1, wherein the first frequency is 60 GHz, and the second frequency is 20 GHz.

4. The down-converter according to claim 1, wherein the first mixer is configured to output the In-phase signal of the fourth frequency by subtracting the second frequency from the third frequency.

5. The down-converter according to claim 1, wherein the second mixer is configured to output the quadrature phase signal of the fourth frequency by subtracting the second frequency from the third frequency.

6. A down-converter comprising:
    a harmonic mixer where a signal of a first frequency, an In-phase signal of a second frequency, and a quadrature phase signal of the second frequency are input, and which outputs a signal of a third frequency generated with the first frequency and second frequency;
    a first mixer where a signal of the third frequency and an In-phase signal of the second frequency are input, and which outputs an In-phase signal of a fourth frequency generated with the third frequency and second frequency; and
    a second mixer where a signal of the third frequency and a quadrature phase signal of the second frequency are input, and which outputs a quadrature phase signal of a fourth frequency generated with the third frequency and second frequency,
    wherein the harmonic mixer outputs a signal of a third frequency by subtracting a twice value of the second frequency from the first frequency, the first mixer outputs an In-phase signal of a fourth frequency by subtracting the second frequency from the third frequency, and the second mixer outputs a quadrature phase signal of a fourth frequency by subtracting the second frequency from the third frequency.

7. A down-converter, comprising:
    a harmonic mixer configured to
        receive a signal of a first frequency, an In-phase signal of a second frequency, and a quadrature phase signal of the second frequency, and
        output a signal of a third frequency generated by using the first frequency and the second frequency;
    a first mixer configured to
        receive the signal of the third frequency and the In-phase signal of the second frequency, and
        output an In-phase signal of a fourth frequency generated by using the third frequency and the second frequency; and
    a second mixer configured to
        receive the signal of the third frequency and the quadrature phase signal of the second frequency, and
        output a quadrature phase signal of the fourth frequency generated by using the third frequency and the second frequency,
    wherein the first mixer is configured to output the In-phase signal of the fourth frequency by subtracting the second frequency from the third frequency, and the second mixer is configured to output the quadrature phase signal of the fourth frequency by subtracting the second frequency from the third frequency.

* * * * *